United States Patent [19] [11] 4,078,837
Auth [45] Mar. 14, 1978

[54] ENERGY ABSORBING BUMPER
[75] Inventor: Paul Auth, Bricktown, N.J.
[73] Assignee: Action Research Development Corporation, Bricktown, N.J.
[21] Appl. No.: 638,501
[22] Filed: Dec. 8, 1975

Related U.S. Application Data
[63] Continuation-in-part of Ser. No. 523,319, Nov. 13, 1974, abandoned.
[51] Int. Cl.$^2$ ............................................. B61F 19/04
[52] U.S. Cl. .................................. 293/71 R; 213/1 A
[58] Field of Search ..................... 293/1, 60, 70, 71 R, 293/85, 88, 89, 62, 63, DIG. 3; 188/1 C; 213/1 A

[56] References Cited
U.S. PATENT DOCUMENTS

| 2,732,040 | 1/1956 | DeVost et al. | 293/85 |
| 3,284,122 | 11/1966 | Rich | 213/1 A X |
| 3,494,607 | 2/1970 | Rusch | 293/71 R X |
| 3,610,609 | 10/1971 | Sobel | 293/63 X |
| 3,724,833 | 3/1971 | Sergay | 293/88 X |
| 3,752,462 | 8/1973 | Wight, Jr. | 293/88 X |

Primary Examiner—Joseph F. Peters, Jr.
Assistant Examiner—Norman L. Stack, Jr.
Attorney, Agent, or Firm—Lerner, David, Littenberg & Samuel

[57] ABSTRACT

An energy absorbing bumper for attachment to vehicles, such as automobiles, is disclosed. The energy absorbing bumper includes a low density foamed plastic having a semi-rigid cellular structure, so that upon impact greater than a pre-determined minimum impact the energy absorbing material collapses, and absorbs substantially the entire impact, without any increase in its density. In particular, low density foamed plastics, such as urethane, are empolyed, having a density of less than 7 pounds per cubic foot. The bumper disclosed includes means for permitting collapse of the foamed plastic without any substantial increase in its density, so that the plastic itself absorbs substantially the entire force of impact upon the bumper.

7 Claims, 10 Drawing Figures

ENERGY ABSORBING BUMPER

CROSS REFERENCES TO RELATED APPLICATIONS

This application is a continuation-in-part of application Ser. No. 523,319, filed on Nov. 13, 1974, now abandoned.

FIELD OF THE INVENTION

The present invention relates to energy absorbing bumpers for attachment to vehicles, such as automobiles.

More particularly, the present invention relates to such energy absorbing bumpers which are capable of withstanding severe impact without consequent damage to the vehicles to which they are attached.

Still more particularly, the present invention is concerned with energy absorbing bumpers containing energy absorbing materials which can absorb large amounts of energy.

BACKGROUND OF THE INVENTION

With the continued development of vehicles capable of traveling at greater and greater speeds, there has been a continuing attempt to develop bumpers and other means to protect the vehicle body from damage upon impact. Many such bumpers have been developed in the past, but each is capable of only withstanding limited amounts of impact pressure without imparting substantial damage to the vehicle body.

For example, devices such as that disclosed in U.S. Pat. No. 1,438,177 to Hatashita have employed springs and other means for the temporary absorption of shocks imparted to the outer surface of bumpers, such that the spring then immediately returns to its initial position subsequent thereto. For this reason, as soon as the impact is greater than the tension on the spring, damage is caused to the front part of the automobile, as shown therein.

Furthermore, other such bumpers, including water-filled bumpers and hydraulic shock absorbers, of relatively high cost, have also been developed. Such bumpers, which normally cannot withstand impacts of greater than about 5 miles per hour, have thus led to the need for further developments. U.S. Pat. No. 3,694,019 to Carter discloses an energy absorbing bumper which can allegedly withstand low speed collision damage (approximately 5 miles per hour) and which relies upon the realignment of the molecules in certain synthetic thermoplastic materials during elongation to do so. These materials thus must be capable of being permanently elongated. Thus, when employing such a device, not only is a complex structure required, but after a single such impact complex methods for readjusting the device and removing the stretched material and replacing it with new material is required.

For these and other reasons there have been various attempts to employ new materials, and particularly various foamed plastic materials, for such purposes. Thus, U.S. Pat. No. 3,610,609 to Sobel discloses a deformable shock-absorbing bumper guard. The specific device of this patent includes both an encased rigid crushable cellular material and a flexible compressible material which returns to its normal position after impact. The encased crushable material of Sobel is ". . . totally encased . . . " in a housing, thus " . . . assuring density buildup upon impact of collision." Furthermore, the resilient material, or rubber, of this patent is intended to return to its normal dimensions when the colliding vehicle or body is removed.

Furthermore, U.S. Pat. No. 3,493,257 to Fitzgerald, et al, teaches an encased micro-cellular foam bumper including an inner high density foam material and an outer elastomeric coating thereon. This bumper is again intended to ". . . return to its original configuration . . . " after impact. Furthermore, the foamable material is cured to produce a tough elastomeric micro-cellular foam having a density of from 25 to 60 pounds per cubic foot, and which is integrally bonded to the elastomeric film thereabout.

In addition, U.S. Pat. No. 3,666,310 to Burgess, et al. is another shock absorbing bumper which includes a foamed plastic material therewithin. The patentee therein again teaches the necessity of employing high density foams, and particularly such foams which are "tight" foams having ". . . between about 90 and about 99% of the cells being of the open type . . . " The specific polyurethane foam employed by Burgess, et al. has a material density of over 7 pounds per cubic foot and preferably between 10 and 20 pounds per cubic foot, and is again encased within a rigid bumper assembly, or in certain embodiments by a high density skin, as in the prior Fitzgerald et al. patent. Again, therefore, the increase in density of the foam material during impact is also contemplated by this patentee.

Finally, U.S. Pat. No. 3,721,433 also to Sobel, teaches another deformable shock-absorbing guard for attachment to automobiles, this particular guard including an encased foamed plastic material, and preferably including different density components allegedly further aiding in accomplishing safe deceleration. The patentee thus employs various open cell rigid crushable foam-like materials, in addition to an 8 pound per cubic foot fine rigid and crushable closed cell foam-like material therein. The patentee specifically notes that these components are "completely enclosed and sealed in the housing."

It is therefore an object of this invention to provide an energy absorbing bumper which overcomes all of these deficiencies on such prior art bumpers.

SUMMARY OF THE INVENTION

In accordance with the present invention, it has now been discovered that a highly improved energy absorbing bumper for attachment to motor vehicles, such as automobiles, trucks, etc., can be prepared by including a specific energy absorbing material between the main body of the vehicle and the point of impact in a particular bumper structure, so that upon more than a predetermined minimum amount of impact the energy absorbing material collapses and the main vehicle body is thereby protected. Specifically, a low density plastic foam material which includes void spaces is employed, so that upon an impact of greater than a predetermined minimum impact this specific energy absorbing material collapses. This is accomplished by permitting the foamed plastic material to be free to escape, so that there is substantially no density increase in the foamed plastic material during its collapse. This results in the absorption by this material of substantially all of the energy so imparted, and without the subsequent transfer or release of that energy.

In one embodiment, the low density foamed plastic material has a semi-rigid cellular structure, and is preferably relatively inelastic, particularly as compared to such elastic materials as rubber, so that it does not return to its original shape subsequent to such impact, but totally absorbs the entire impact upon its collapse.

In another embodiment of the present invention, the energy absorbing material comprises a low density foamed plastic material including a void-containing structure where air or other gases are contained, such as polyurethane foam, etc., and particularly has a relatively closed cellular structure.

In another embodiment, the energy absorbing bumper includes an inner support member rigidly attached to a vehicle, an outer casing mounted with respect to said inner support member for linear movement with respect thereto, and the low density foamed plastic material is disposed between the inner support member and the outer casing. Preferably, the inner support member and the outer casing are mounted with respect to each other by means of a plurality of mounting members which permit the inner and outer members to be freely movable with respect to each other. In this manner, the inner support member and outer casing are maintained spaced apart by the energy absorbing material itself, and the minimum degree of impact which the outer casing can withstand before initial collapse occurs is determined by the properties of the energy absorbing material, such as its rigidity or compressive yield strength.

Guide members may also be employed in order to assure that upon such excessive impact the movement of the outer casing with respect to the inner support member is linear, and directed towards the main portion of the vehicle body.

In a preferred embodiment, the movement of the outer casing towards the inner support member is substantially unencumbered except by the foamed plastic material itself. The foamed plastic material is therfore relatively free to escape from between these members, and there is substantially no increase in the density of the foamed plastic material as the outer casing moves toward the inner support member.

In another embodiment, various internal stabilization components are employed between the outer casing and the inner suport member to provide additional surface area to maintain the low density foamed plastic material throughout the space between the outer casing and the inner support member.

DETAILED DESCRIPTION

Figure 1:
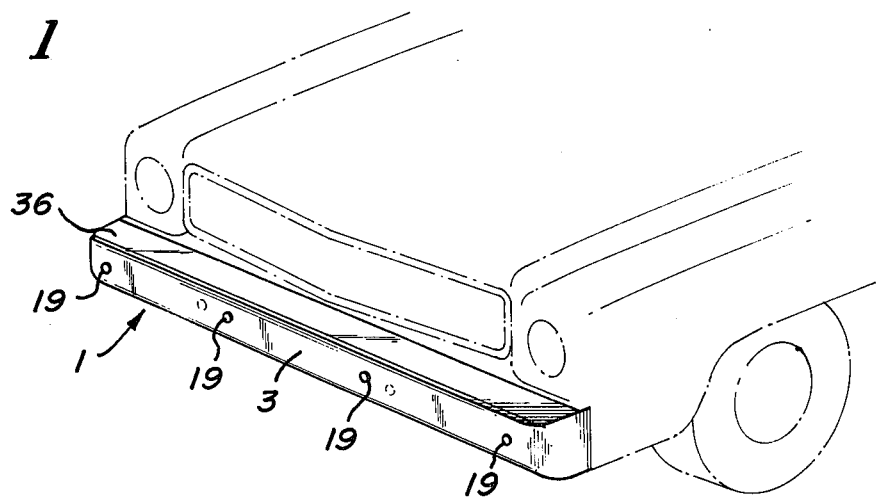
FIG. 1 is a front perspective elevational view of the energy absorbing bumper of the present invention mounted on the front portion of an automobile.

Referring to the drawings, in which like numerals refer to like portions thereof, FIG. 1 shows the energy absorbing bumper of the present invention mounted upon the front chassis portion of an automobile, as a conventional bumper is mounted. As can thus be seen, the bumper 1 extends a short distance from the front of the vehicle, so that it absorbs any impact upon collision therewith.

Figure 6:
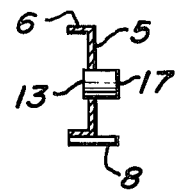
FIG. 6 is a side elevational partially sectional view of the inner support member of the energy absorbing bumper of the present invention taken along lines 6—6 of FIG. 5.

The energy absorbing bumper itself includes an outer casing 3 which comprises the outermost portion of the bumper, i.e., that portion which is directly engaged upon any impact. This outer casing is of conventional smooth appearance, and may be constructed of steel or other such materials, as required for purposes of strength, appearance, etc. The energy absorbing bumper 1 also includes an inner support member 5 which is rigidly mounted upon the frame of the vehicle. The inner support member 5 may thus also be prepared from steel or other such materials of high strength and durability. As can be seen in FIG. 6, the inner support member 5 is generally of a U-shaped configuration, so that the two extending arms 6 can be easily mounted directly to an automobile frame, and for other reasons which will become apparent hereinafter.

In order to mount the outer casing 3 with respect to the inner support member 5 a pair of guide tubes 9 are mounted upon the inside surface of the outer casing 3, such as by welding at points 11. These guide tubes 9 thus project perpendicularly from the inner surface of outer casing 3. Furthermore, corresponding apertures 13 are provided through the main portion of the inner support member 5, along with inner guide tubes 17, which correspond with the guide apertures 13, and which thus may direct the motion of guide tubes 9 upon impact. That is, when the outer casing 3 is mounted upon the inner support member 5, the pair of extending guide tubes 9 are inserted into corresponding apertures 13 and inner guide tubes 17, so that the outer casing 3 may thus move lineraly towards the inner support member 5 as the guide tubes 9 move within these apertures 13.

Figure 2:
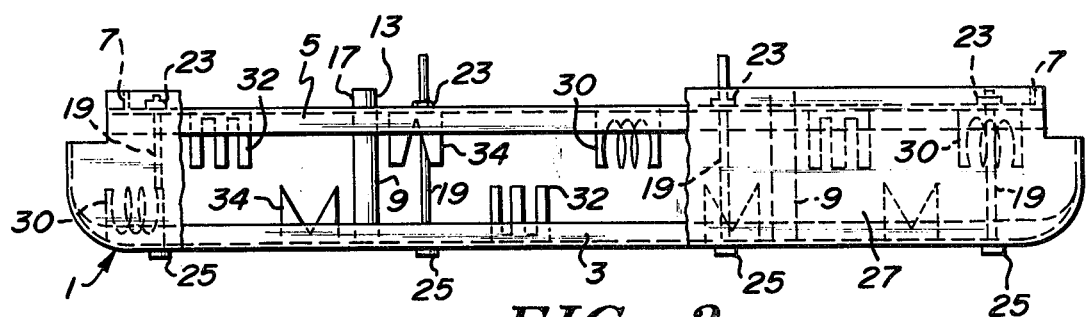
FIG. 2 is a top sectional elevational view of the energy absorbing bumper of the present invention.
Figure 3:
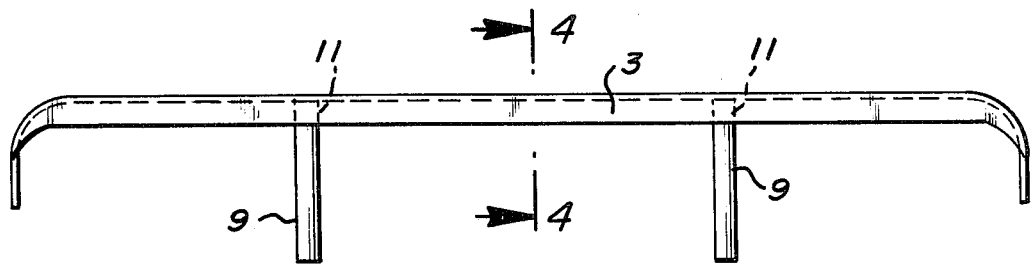
FIG. 3 is a top elevational sectional view of the outer casing portion of the energy absorbing bumper of the present invention.
Figure 5:
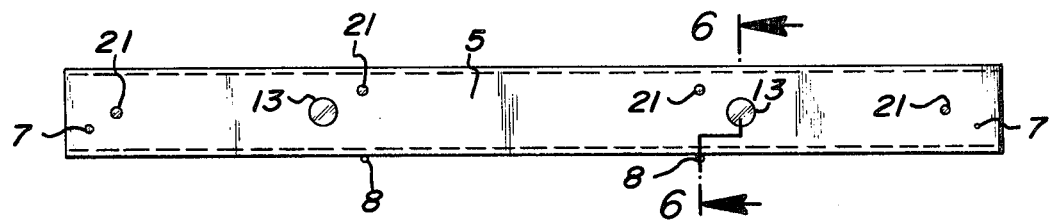
FIG. 5 is a front elevational partially sectional view of the inner support member of the energy absorbing bumper of the present invention.
Figure 4:
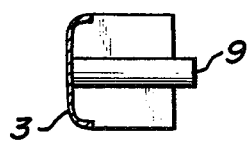
FIG. 4 is a side sectional view of the outer casing portion of the energy absorbing bumper of the present invention taken along lines 4—4 of FIG. 3.

To prevent the outer casing 3 from separating more than a predetermined distance from the inner support member 5, support rods 19 are employed, four of which are shown in FIG. 1. The support rods 19, as can be seen with respect to the outer casing 3 of FIG. 1, pass through apertures in the outer casing 3, and corresponding apertures 21 in main support member 5, as seen in FIG. 5. These support rods 19 which are preferably threaded, may thus maintain the outer casing and inner support member in their normal fixed positions by means of applying nuts 23 to the portion of the support rods 19 extending from the inner support member 5, while the outer face of the support rods 19 will preferably carry carriage bolts 25, to maintain the smooth surface appearance of the outer face of outer casing 3. In addition, as can be seen in FIG. 2, the two inner support rods 19 will extend a distance beyond the inner face of inner support member 5, in order that they may be bolted directly to the frame or chassis of the vehicle to secure the entire bumper of this invention thereto. Added strength is given to this mounting by means of a pair of threaded rod components 7, as shown in FIG. 2, which are preferably added directly to the rear face of inner support member 5 as shown, again for attachment, or bolting, to the vehicle frame, and also by means of another pair of threaded rods 8, which also are added directly to the inner support member 5, as shown in FIG. 6, for direct attachment or bolting to the main frame of the vehicle. As shown in the embodiment of the drawings, the pair of threaded rods 8 are located at corresponding locations below the inner pair of support rods 19. In this manner the entire bumper 1 may be firmly anchored to the vehicle.

Figure 7:
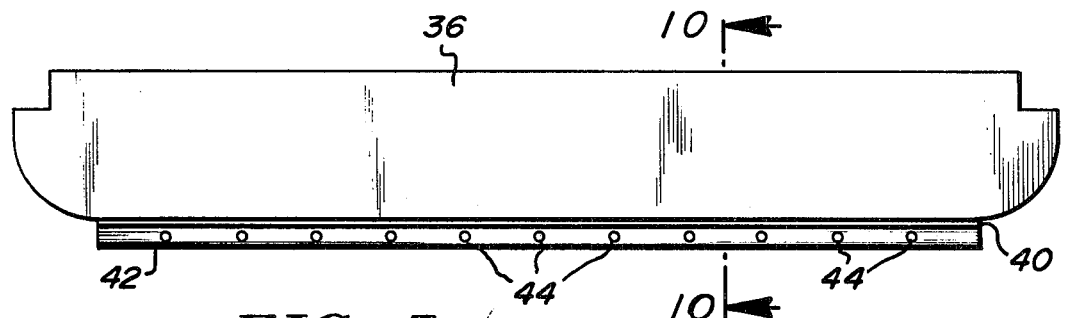
FIG. 7 is a top elevational view of a top enclosure panel for use with the energy absorbing bumper of the present invention.
Figure 8:
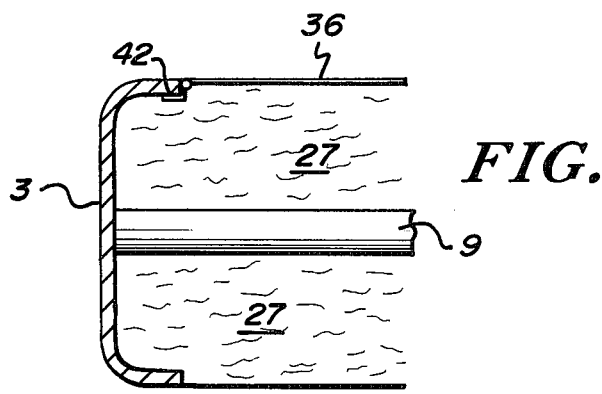
FIG. 8 is a side sectional view of the energy absorbing bumper of the present invention including a top enclosure panel.
Figure 10:
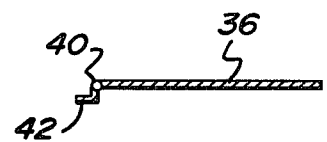
FIG. 9 is a side sectional view of the energy absorbing bumper of the present invention including a top enclosure panel shown subsequent to impact and FIG. 10 is a side sectional view of the top enclosure cover taken along lines 10—10 of FIG. 7.
Figure 9:
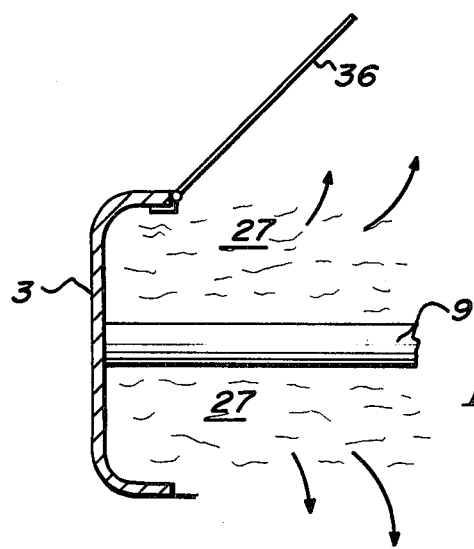

The outer casing 3 and the inner support member 5 are therefore maintained in their separated relationship, as shown in FIG. 2, in this manner, with the foamed plastic material therebetween. Basically, it is most desirable to, in this manner, permit the foamed material to escape freely from between the outer casing 3 and the inner support member 5 through the top and bottom thereof as shown in FIG. 2. However, principally for aesthetic purposes, it is possible to employ a top enclosure member 36, as shown in FIGS. 1 and 7. As specifically shown in FIG. 7, this top enclosure cover 36 is arranged in a manner such that it does not interfere with the free release of the foam plastic material from between the outer casing 3 and the inner support member 5 during collapse thereof. The top enclosure cover 36 therefore includes a hinge member 40 including a projecting stub 42 including a series of screw holes 44 therein. In this manner, the hinge can be attached to the inside of the outer casing 3, as shown in FIGS. 8 and 9 thereof. By employing such a hinge 40 it is possible upon impact for the top enclosure cover 36 to swing open, as shown in FIG. 9, thereby permitting the foamed plastic material to freely release from within the space between the outer casing 3 and the inner support member 5, as is also shown in FIG. 9 hereof. Again in this manner, it is assured that there is no density increase in the foamed plastic material during such impact and collapse thereof. It is preferred that the bottom portion of the space between the outer casing 3 and the inner support member 5 be left open, as is also shown in FIGS. 8 and 9. This does not present any problems with respect to the foam material, since after it is hardened the foam material will maintain the space therebetween, and will only be released during impact on the outer casing 3 as discussed above. In addition, subsequent to impact if it is desired to refill the space between the outer casing and the inner support member with additional foamed plastic material, it would only be necessary to place a temporary closure member over the bottom portion of the space between the outer casing 3 and the inner support member 5 until the foamed plastic material was permitted to harden therebetween, and then remove this member prior to use. As shown in FIG. 2, the energy absorbing material 27 is thus disposed between the outer casing 3 and the inner support member 5 so that upon any high impact to the outer surface of the outer casing 3, whereupon the energy absorbing material 27 can no longer retain its semi-rigid structure, and begins to collapse, the outer casing 3 begins to move towards the inner support member 5, as guide tubes 9 cause the motion of the outer casing towards the inner support member to be linear, and the main force or thrust of the impact may be absorbed by the energy absorbing material 27 disposed therebetween. Furthermore, the top closure cover 36 (or other such means) does not prevent the outer casing from moving towards the inner support member, nor does it prevent the energy absorbing material 27 from escaping therefrom, so that there is substantially no increase in the density of the energy absorbing material 27 as the outer casing moves towards the inner support member. In this manner substantially the entire impact is absorbed by this material.

Regarding this energy absorbing material, it is a material which includes a large number of void spaces, such as air or other gas bubbles, which preferably thus form a predominantly closed cellular structure which is preferably relatively rigid in nature. The energy absorbing material 27 itself must be at least semi-rigid in nature, so that it can maintain its configuration filling the space between the outer casing 3 and the inner support member 5 during normal use. Further means may also be provided, however, for achieving this result, and these are described in greater detail below. Further, the energy absorbing material is a material of low resiliency, that is it does not possess the resiliency of a material such as rubber, which temporarily collapses upon impact, but immediately returns to its original shape or configuration. Because of the presence of void spaces within the energy absorbing material of the present invention, and its relatively rigid nature, it is designed to collapse upon impacts greater than a certain minimum predetermined force, to fully absorb the impact, and thus protect the main body of the vehicle. Thus, as will be seen below, certain energy absorbing materials containing predominantly closed cellular structures, and of certain highly preferred densities, are critical for use herein.

Specifically, the energy absorbing material 27 may be foamed plastic or other polymeric material, having a relatively low density of below about 7 pounds per cubic foot, preferably below about 6 pounds per cubic foot, i.e., from about 1 to 6, and most preferably from about 1 to 3 pounds per cubic foot. These materials must, however, have a semi-rigid consistency so that they may be disposed between the outer casing 3 and the inner support member 5, and maintain that disposition, and preferably include a predominantly closed cellular structure. One type of plastic foam is prepared by whipping air or other gases into the plastic mass of the plastic material to be employed before the plastic material actually sets, and then injecting the foam into the space between the outer casing 3 and the inner support member 5. This type of plastic material would include materials such as urea-formaldehyde resins and polyvinyl-formaldehyde plastic foams. In other such plastic foams, gases are produced in the plastic mass itself during processing. Thus, for example, when a polyester resin and an aromatic diisocyanate react to form a resin prepolymer, which then reacts with water to form a urethane polymer, carbon dioxide gas is formed during this reaction, thus causing the urethane resin to be cellular in nature. This material is thus an excellent foamed plastic for use in the present invention. Another example is the preparation of phenol formaldehyde resin foams, which is the product of an exothermic reaction such that the water produced as a result thereof is turned to steam, bubbles of which expand the plastic, again forming the plastic void-containing or cellular-type structure.

Still further, in other plastic forming processes or reactions, no gaseous by-products are formed, and yet the plastics themselves are excellent candidates for foaming. In these cases, it is possible to add so-called blowing agents, or substances which decompose to form gases, at temperatures below the gelling temperature of the plastic. These substances thus include dinitroso compounds such as dinitroso pentamethylene tetramine, and hydrazides such as benzene sulfonyl hydrazide, etc., while some of these compounds thus evolve nitrogen gas, certain inorganic blowing agents, such as bicarbonates, which evolve carbon dioxide, may also be used. Additional blowing agents include the various fluorocarbons, etc. This latter techinque may thus be employed in conjunction with the preparation of many additional plastics, including polyethylene, silicone, epoxy, and vinyl resins. In a preferred embodiment, polyurethane foams may be prepared employing such blowing agents, such as the various fluorocarbons, in conjunction with the diisocyanate and polyester resin.

Finally, further foamed plastics may be prepared from plastic granules, such as polystyrene, which expands upon heating to form a rigid unicellular material. Polystyrene foam is thus prepared by heating the molten polystyrene with the compressed methyl chloride (which is soluble in polystyrene melts) and then lowering the pressure.

The most preferred energy absorbing materials 27 will include the semi-rigid and rigid urethane foams, prepared in the above-noted manner, or generally by reacting polyols, that are hydroxyl-terminated compounds with a diisoycyanate and water in the presence of a catalyst. Generally polystyrene, epoxy, acrylonitrile styrene polymers, cellulose acetate, phenolic, and phenolic resins, and vinyl (including vinyl copolymers) foams may be used, with the polystyrene, cellulose acetate and epoxy foams being particularly preferred. Additional examples of such materials also include foamed polyvinyl chloride, phenol-formaldehyde resin foams, urea-formaldehyde foams, etc.

The main requirement for these low density foamed plastic materials is that they have the above mentioned cellular type structure, be collapsable upon severe impact, and have a density of below about 7 lb/ft$^3$, preferably below 6 lb/ft$^3$, e.g., from about 1 to 6 lb/ft$^3$, and most preferably from about 1 to 3 lb/ft$^3$, and again will most preferably have a predominantly closed cellular structure, i.e.—of about 90% closed cells therein. In addition, these materials should have a compressive yield strength of from 2 to 3,000 lb/sq. in., or greater, preferably from about 10 to 1,000 sq. in., and most preferably from about 25 to 1,000 lb/sq. in., a tensile strength of from 15 to 1,000 lb/sq. in., preferably from 15 to 800 lb/sq. in., and most preferably from 15 to 600 lb/sq. in., a shear strength of from 15 to 1,500 lb/sq. in., preferably from 25 to 700 lb/sq. in., and an impact strength of from 0.5 to 8 lb/sq. in., or greater, and preferably from 1 to 5 lb/sq. in.

Preferably, these materials, such as the foams described above, may be prepared within the bumper itself by injecting the plastic or other material to be formed into the bumber along with the blowing agent to be employed. In this manner, it will be possible to reintroduce additional energy absorbing material into the bumper following an impact in which the original material present therein has collapsed, by merely injecting additional material into the space left by the collapsed material.

Of course, as discussed above, it may be necessary to employ a temporary bottom enclosure member in conjunction with this injection of fresh energy absorbing material 27 into the bumper following an impact. After the material hardens, however, this temporary bottom enclosure member may then be removed, and the bottom space between the outer casing 3 and the inner support member 5 may then be left completely open as discussed herein.

As discussed above, and as shown in FIG. 2, certain additional stabilizing elements 30 through 34 may also be employed within the space between the outer casing 3 and the inner support member 5. Thus, thin steel rods may be formed upon either the inner surface of the outer casing 3, or the outer surface of the inner support member 5, or bridging the two, in order to provide added surface area within the space therebetween upon which the energy absorbing material 27 can form, in order to maintain the energy absorbing material 27 throughout the space therebetween until an accident or other collision occurs. These stabilizing components may include such components of various configurations, in order to provide such surface area, including coiled members 30, rectangular members 32, angular components 34, etc. Again, the reason for including these stabilizing components is to permit the energy absorbing material 27 to adhere to the surface area provided by these materials, and to thus maintain the energy absorbing material in a stable configuration between the outer casing 3 and the inner support member 5.

It can thus be seen that the energy absorbing bumper of the present invention can provide for significantly improved results, particularly with respect to conventional energy absorbing bumpers being supplied with 1974 model automobiles, which would have resulted in extensive damage to the automotive body at the conditions of the below-noted example, and hundreds of dollars in property damage resulting therefrom.

EXAMPLE

As a test vehicle, a 1966 Chevrolet three-quarter ton panel truck, having an approximate weight of 4,000 pounds, was employed, the energy absorbing bumper of the present invention, including a urethane foam disposed between the outer casing and the inner support member was mounted upon the front portion thereof. The foam which was employed was a standard urethane foam having a core density of 1.75 lbs/ft$^3$, a tensile strength of 24 lb/sq. in., a compressive strength of 16 lb/sq. in., a flex strength of 40.8 lb/sq. in., and about a 90% closed cellular structure. As an alternative, a high compressive urethane foam having a core density of 2.7 lbs/ft$^3$, a tensile strength of 63 lb/sq. in., a compressive strength of 42.5 lb/sq. in., and also about a 90% closed cellular structure may also be employed. Utilizing the former standard foam, the test vehicle was driven directly into a solid concrete wall, traveling at a speed of approximately 12 miles per hour at the point of impact. The energy absorbing bumper, whose outer casing was originally mounted approximately 8 inches from the inner support member, was compressed approximately 1⅜ inches from such impact, i.e., about 18 percent of its total effective compression, without any measurable damage to the vehicle itself.

What is claimed is:

1. An energy absorbing bumper for attachment to vehicles comprising:
    (a) A housing defined by an inner support member attached to said vehicle, and an outer casing mounted with respect to said inner support member for parallel linear movement in horizontal direction with respect to said inner support member,
    (b) An energy absorbing material disposed within said housing, said energy absorbing material comprising a low density foamed plastic material having a density of less than about 7 lb/ft$^3$, and including a plurality of void spaces therewithin, such that said energy absorbing material collapses upon the exertion of more than a predetermined amount of impact upon said outer casing, and
    (c) Means for providing unrestrained movement of said low density foamed plastic material in a vertical direction so that upon movement of said outer casing towards said inner support member and the collapse of said foamed plastic material, said foamed plastic material is compressed in said horizontal direction and is unrestrained to move from said housing in said vertical direction, so that said energy absorbing material absorbs substantially the entire force of said impact and return of said housing to its initial position subsequent to said impact is avoided.

2. The energy absorbing bumper of claim 1 wherein said means for permitting the unrestrained movement of said foamed plastic material in said vertical direction comprises a top closure member disposed transversely to said inner support member and said outer casing, said top closure member hingedly attached to said housing.

3. The energy absorbing bumper of claim 1 wherein said foam plastic material has a density of between about 1 and 6 lb/ft$^3$.

4. The energy absorbing bumper of claim 1 wherein said low density foam plastic material has a rigid predominantly closed cellular structure.

5. The energy absorbing bumper of claim 4 wherein said closed cellular structure comprises at least about 90% closed cells.

6. The energy absorbing bumper of claim 1 including means for maintaining said energy absorbing material in a stabilized position with respect to said vehicle.

7. The energy absorbing bumper of claim 1 wherein said low density foam plastic material is selected from the group consisting of foamed urethane, styrofoam, polystyrene, epoxy, cellulose acetate, and mixtures thereof.

* * * * *